United States Patent
McOran-Campbell

[11] 3,854,757
[45] Dec. 17, 1974

[54] COUPLING FOR PIPE-LIKE COMPONENTS

[75] Inventor: Ivan Charles McOran-Campbell, Salisbury, Rhodesia

[73] Assignee: Turners Asbestos Products (Private) Limited, Salisbury, Rhodesia

[22] Filed: July 6, 1972

[21] Appl. No.: 269,297

[30] Foreign Application Priority Data
July 8, 1971 Rhodesia................................. 262

[52] U.S. Cl. ............................... 285/100, 285/369
[51] Int. Cl. ............................................. F16l 17/00
[58] Field of Search ............ 285/100, 99, 101, 102, 285/103, 104, 105, 113, 108, 369

[56] References Cited
UNITED STATES PATENTS

| | | | |
|---|---|---|---|
| 2,177,438 | 10/1939 | Miller | 285/113 |
| 2,687,229 | 8/1954 | Laurent | 285/113 X |
| 2,745,554 | 5/1956 | Bolton et al. | 285/113 X |
| 3,226,137 | 12/1965 | Trnka | 285/113 |
| 3,479,063 | 11/1969 | Raver | 285/108 |
| 3,499,669 | 3/1970 | Hait | 285/189 |
| 3,724,879 | 4/1973 | Snyder | 285/101 |

Primary Examiner—Dave W. Arola
Attorney, Agent, or Firm—Karl W. Flocks

[57] ABSTRACT

A coupling is disclosed for constant inside diameter pipes (or other components), each pipe having an end spigot of lesser outside diameter than the remainder of the pipe. An axially displaceable annular piston surrounds each spigot, and an annular collar surrounds the pistons. Rubber or like-material seals are provided between each piston and the collar, and between each piston and the associated spigot. The spigots are not in abutting relationship and the pressure fluid inside the pipes thus acts on the outsides of the spigots (partly by way of the internal pressure in the piston-spigot seals) as well as their insides to balance the load on them and prevent bursting.

12 Claims, 7 Drawing Figures

COUPLING FOR PIPE-LIKE COMPONENTS

This invention relates to pipe couplings.

In the design of piping for the conveyance of fluids under pressure when using materials which have a relatively low tensile strength, it is found to be economically desirable to design for a range of ascending working pressures in each size or nominal bore up to the economic or practical limit for the particular material. The wall thickness of the pipe is progressively increased as the design working pressure increases. There are two basic and fundamentally different approaches to such a design problem—these are:

1. To decide that for each nominal size or bore there shall be determined an outside diameter of the pipe which is held constant regardless of design working pressure and wall thickness. This results in the actual bore being continually reduced as wall thickness increases.
2. To decide that for each nominal size or bore the actual bore shall be held constant regardless of working pressure and wall thickness. This results in a different outside diameter for each wall thickness in a given nominal size. This has undesirable implications as regards economics of production and stocking not only as affecting the piping itself, but also as affecting the range of fittings, tees, bends, etc., which are required to suit the range of pipes.

The present invention seeks to overcome the disadvantages arising from the approach described under heading (2).

According to one aspect of the present invention there is provided a coupling for connecting two holow members which, in use, are internally pressurized, each member having a coupling spigot, and there being means defining a chamber around the spigots which chamber is in communication with the interior of the spigots so that the fluid pressure which, in use, exits within the spigots is also applied to the outsides of the spigots, thereby to minimize the risk of the spigots bursting.

The coupling may include a spigot seal of resilient material for each spigot, each spigot seal being provided in a cavity which extends around each spigot and being, in use, compressed by being subjected to said fluid pressure whereby at least part of the outer surface of the spigot is subjected to direct fluid pressure and a further part to pressure derived from the internal pressure in the seal. Preferably, each cavity is open to said fluid pressure on one side of the spigot seal and is open to atmosphere on the other side of the spigot seal via a restricted opening so that exudation of the resilient material from the cavity under the influence of the fluid pressure is limited.

Further according to the invention there is provided a coupling for connecting two hollow members which, in use, are internally pressurized, each member having a coupling spigot of lesser outside diameter than the outside dimension of the adjoining part of the member so that a shoulder is defined between each spigot and the adjoining part; an axially movable annular piston extending around each spigot; an annular collar surrounding the pistons; a collar seal between each piston and the collar; and a spigot seal between each piston and its spigot, the collar and pistons defining a chamber which extends around the spigots and which is in communication with the interior of the spigots, the arrangement being such that, in use, the pressure in said chamber tends to force the pistons apart toward their respective shoulders, and both the insides and outsides of the spigots are subjected to the pressure within said members thereby to minimize the risk of the spigots bursting.

Each collar seal may be located in a circumferentially extending, outwardly facing groove in the outer surface of its piston. Said collar seals are preferably positioned adjacent the ends of the pistons remote from the shoulders.

Each spigot seal can be of compressible material and subjected to the pressure in said chamber, these seals being internally pressurized in use, and their internal pressures being applied to the spigot so that outer surface of each spigot is subjected partly to direct fluid pressure, and partly to the internal pressure of the spigot seal. To this end each spigot seal can be in a cavity which is open to said chamber on one side and to atmosphere on the other.

In one constructional form the end of each piston remote from the shoulder is provided with a circumferentially extending, inwardly projecting rim for co-operation with the end of the associated spigot to limit movement of each piston towards the associated shoulder.

Furthermore the rim of each piston at its end adjacent the shoulder can be reinforced.

Each spigot seal preferably has a main annular portion and a circumferentially extending annular lip projecting axially from the side of the main annular portion remote from said chamber.

Preferably the coupling is in the form of a pipe coupling.

For a better understanding of the invention, and to show how the same may be carried into effect, reference will now be made, by way of example, to the accompanying drawings in which.

Figure 1:
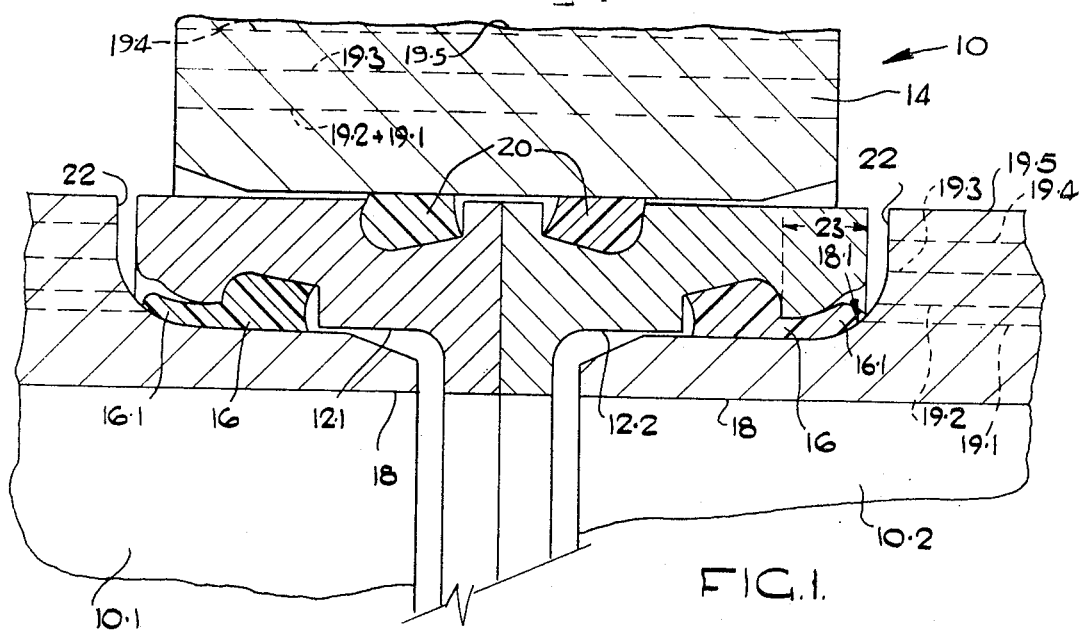
FIG. 1 is a fragmentary section through a pipe coupling in its initially assembled condition.

Referring firstly to FIG. 1, the coupling illustrated is generally designed 10 and serves to connect the end of a pipe 101 to the end of the pipe 10.2. The coupling comprises two pistons 12.1 and 12.2, a collar 14, two spigot seals 16 between the pistons and spigots 18 turned on the ends of the pipes 10.1 and 10.2, and two outer collar seals 20 which are between the pistons 12.1 and 12.2 and the collar 14. It will be noted that all the seals are carried by, and move with, the pistons 12.1 and 12.2.

The bore diameters of the pipes 10.1 and 10.2 are constant regardless of working pressure and as the design working pressure of the pipes increases so their wall thickness is correspondingly increased to enable them to withstand the higher internal pressures. In FIG. 1 the minimum wall thickness is indicated by the line 19.1, that is, for the lowest working pressures for which the pipes 10.1 and 10.2 are designed this is the wall thickness required. Other wall thicknesses 19.2, 19.3, 19.4 and the maximum wall thickness 19.5 are illustrated, this latter wall thickness being the economic or practical limit for the particular material of the pipes 10.1 and 10.2 and their actual bore size. These various pipes will be referred to as classes 19.1 to 19.5.

The spigots 18 are turned to an outside diameter which is slightly less than the outside diameter of the pipe having the lowest design working pressure in the range for the particular bore. In other words, the outside diameter of the spigot is slightly less than the diameter represented by the line 19.1 and the outside diameter of the spigot is constant for all fittings and pipes of the nominal bore illustrated. The collar thickness also varies with working pressure as indicated by lines 19.1 to 19.5.

Each seal has a dual function:

a. To prevent working fluid escaping between the piston 12.1 or 12.2 and the associated pipe spigot 18.

b. To provide the means for applying working fluid pressure to the external portion of the spigot from which the working fluid is excluded by the seal. This is a normal type of hydraulic seal except that it has an extension lip 16.1 on the side away from the working fluid. The lip 16.1 extends between the piston rim and the spigot where the gap is sufficiently great to permit the rubber or equivalent material of the seal to be forced out through this gap if it were not further restrained. This restraint will be described in more detail later.

The outer collar seals 20 also have a dual function:

a. To prevent working fluid from escaping between the pistons and the collar 14.

b. To permit angular and translational displacements of the pistons 12 and 12.1 within the collar 14. The angular displacement is required in order to permit deflection between pipe axes and the translational displacement is required in the process of initial compression of those parts of the seals 16 which have the function of transmitting pressure to the surface of the spigot beyond the working fluid seal point. Translational movement is also required to accommodate linear expansion and contraction of the pipes.

Figure 2:
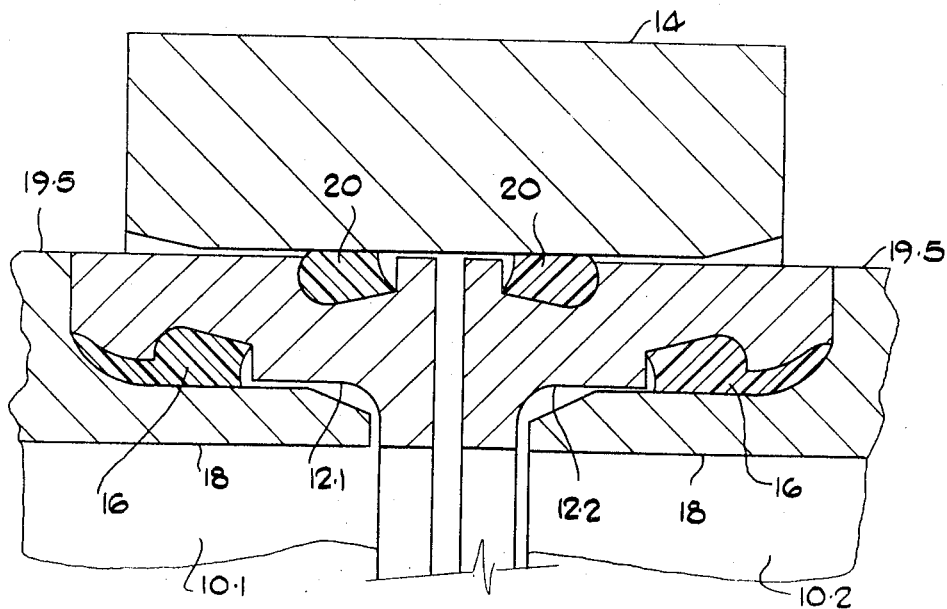
FIG. 2 is a section similar to that of FIG. 1 but shows the coupling when pressurized.

Referring now to FIG. 2, the effect of pressurizing the pipes 10.1 and 10.2 is to drive pistons 12.1 and 12.2 apart until they abut the shoulders formed between the spigots 18 and the full diameter portions of the pipes. These shoulders are referenced 22 in FIG. 1. This movement creates two closed annular cavities into which the rubber of the seals 16 is forced by fluid working pressure. Once the spaces are closed and filled with rubber, the rubber transmits pressure from the working fluid to the spigots and the load on the spigots is reduced which load, at higher working pressure, might cause the spigots to burst. It is necessary, of course, to ensure that this state is reached before the working pressure exceeds that which can be retained by the relatively thin walled spigots, while simultaneously making allowance for the relatively short length thereof which actually has unbalanced outwardly directed pressurizing forces exerted thereon.

The seals 16 are located as near to the external ends of the pistons as possible. There is a limiting factor when a pipe of class 19.2 is being considered in that the rim width 23 must be sufficient to retain the seal under the magnitude of pressures applied to a class 19.2 pipe.

The position of the seals 20 is chosen with two considerations in mind. Firstly, there is the need to minimize the length of collar 14 while allowing adequate deflection between pipes 10.1 and 10.2. Secondly, there is the need to provide adequate shear strength in the rims 23 of the pistons in order to retain the seal under the highest pressures. In the present design the seals 20 are, in effect, carried by the pipes instead of by the collar and in this case it is possible to locate the seals very close together thus minimizing the requisite length of the collar.

The remaining important design factor, and this only achieves great importance where the highest pressures are being considered, concerns the provision of adequate hoop strength in the outer portions of the pistons where full working fluid pressure is developed internally by the material of the seals 16. If the pistons are to be made of the same material as the pipes, then it is necessary for their outside diameters to exceed that of the pipes by a considerable amount. This is undesirable since it results in a larger, thicker collar, and increases piston size undesirably. Accordingly, the piston outside diameter is, as illustrated, made to match the outside diameter of the highest pressure category pipe. It is then necessary to reinforce the piston outer rims 23 or to make them of a stronger form of the basic pipe material thereby to increase their design tensile strength by a factor of, say, 2.5 to 3.

Referring now to FIGS. 3 to 6, the mode of operation of the coupling will now be described for each of classes 19.1 to 19.5 illustrated in FIG. 1.

CLASS 19.1 (Lowest Pressure) CASE

Figure 3:
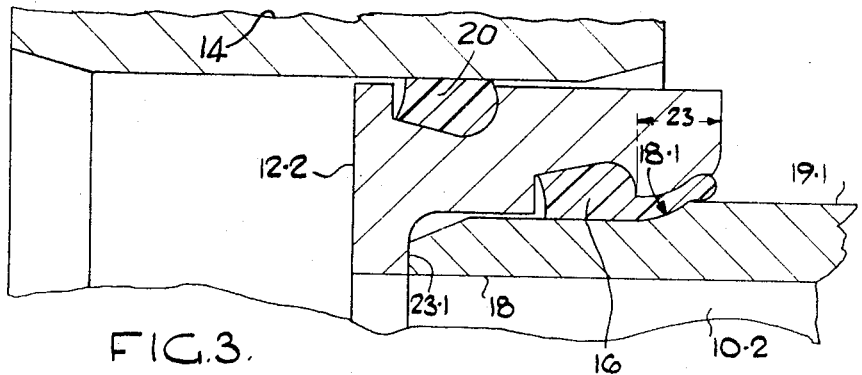
FIGS. 3 to 5 are fragmentary sections through couplings of the form illustrated in FIGS. 1 and 2, the outside diameters of the pipes being different in each Figure.

This case is illustrated in FIG. 3 where the coupling is shown in the pressurized state. It will be noted that the piston 12.2 has a circumferentially extending inwardly projecting rim 23.1 at its free end. In the absence of the pipe shoulder 22 to limit the travel of the piston, the piston 12.2 has moved until its inwardly projecting rim 23.1 butts against the end of the spigot 18. The piston is thus retained and the external surface of the rim 23 is so designed that in conjunction with the part formed radius 18.1 on the spigot, further exudation of rubber from seal 16 is prevented within the maximum working fluid pressure for this class.

CLASS 19.2 CASE

Figure 4:
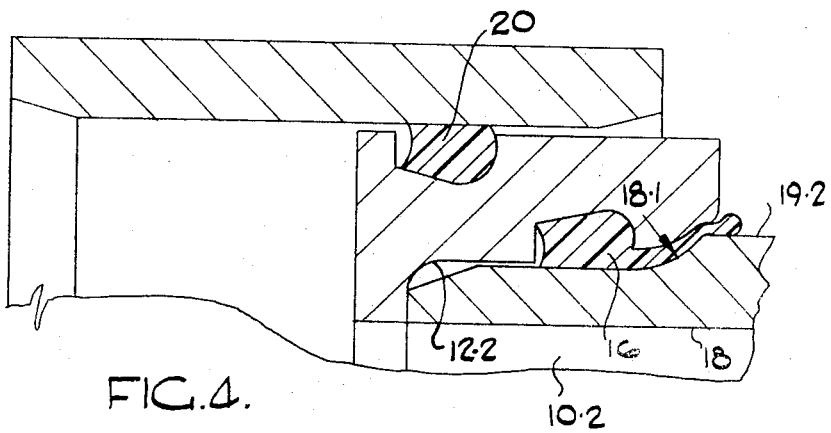

This case is illustrated in FIG. 4 where the joint is shown in the pressurized state. The function is generally the same as already described for Class 19.1. The only difference is that additional restriction is provided against rubber exudation at this higher pressure by the further formation of radius 18.1 which results from the larger outside diameter of the Class 19.2 pipe.

CLASS 19.3 CASE

Figure 5:
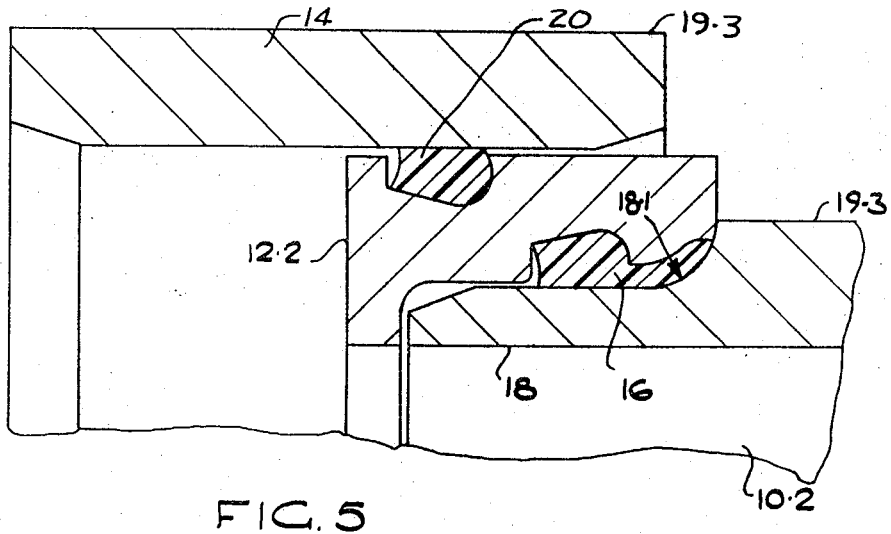

This is illustrated in FIG. 5 where the joint is shown in the pressurized state. The function is generally the same as for Class 19.5 which is illustrated in FIGS. 1 and 2. It will be noted that with further formation of radius 18.1 which results from the larger outside diameter of the Class 19.3 pipe, the piston butts onto the pipe shoulder before its rim reaches the spigot end. The seal function is therefore the same as for Class 19.5 with a closed space, exudation of rubber being limited and the build-up of full working fluid pressure over the full length of the spigot being assured.

CLASS 19.4 CASE

Except for the increased outside diameter of the pipe, conditions are indentical with Class 19.3 FIG. 5.

CLASS 19.5 CASE

This case has already been described in detail with reference to FIGS. 1 and 2.

Figure 7:
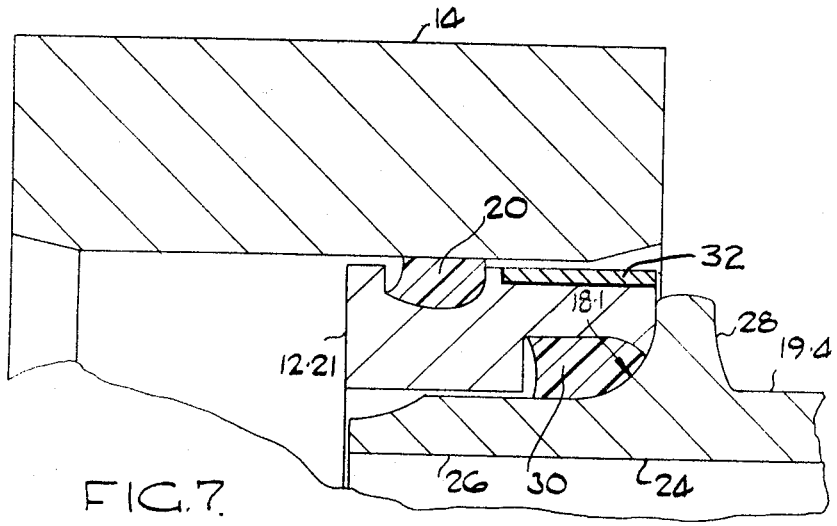
FIG. 7 is a diagrammatic fragmentary section illustrating a coupling in association with a pipe fitting.
Figure 6:
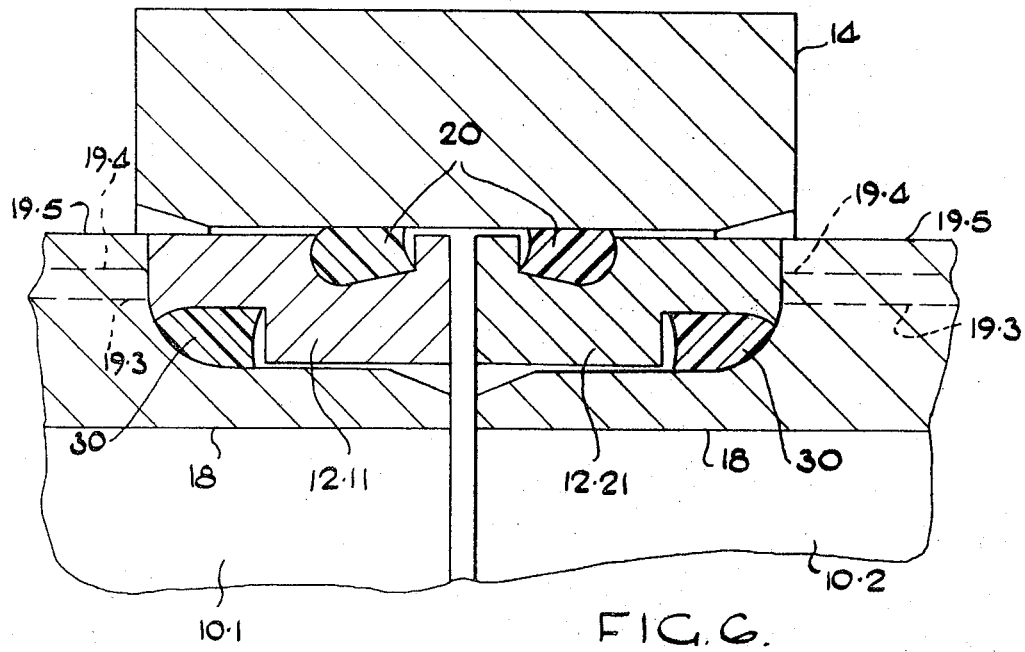
FIG. 6 illustrates a modified form of coupling.

Before dealing with the modified construction illustrated in FIG. 6, reference will first of all be made to FIG. 7 which shows a coupling 10 for connecting a pipe (equivalent to the pipe 10.1 in FIG. 1 but not illustrated) to a pipe fitting 24. The pipe fitting 24 has a main outside diameter 19.4 and a spigot 26 which is turned to the same outside diameter as the spigots 18 described above. A radiussed shoulder is also provided, this shoulder being referenced 28 and having its radius 18.1 equivalent to the radius 18.1 discussed above. The seal 20 is of the type described above but the piston, referenced 12.21 and the seal 30 are of the type illustrated in FIG. 6. It will be understood, however, that the seal 30 and piston 12.2 could be replaced by ones identical with those illustrated in FIGS. 1 and 2.

The pipe coupling illustrated in FIGS. 1 and 2 is suitable for any pressure category of pipe in the range of classes 19.1 to 19.5. Great economies in production and stocking not only of the pipes themselves but also of ancillary equipment such as fittings, tees, bends, etc., are thus obtained. However, this universitality can be departed from if desired in the higher pressure ranges, that is, ranges 19.3 19.4 and 19.5. This departure consists of providing a simplified construction for the piston rims and a simplified form of seal 16. In FIG. 6 the modified construction is illustrated in the pressurized condition and includes two pistons 12.11 and 12.21 and seals 30. The remaining components are of the form illustrated in FIGS. 1 and 2. It will be noted that the seals 30 are simplified by the omission of the lip 16.1 and that the pistons are simplified by omission of the rim 23 and the inwardly directed rim 23.1 for abutting the pipe end. A much shorter and simpler piston results. Although the advantage of completely universal suitability is lost, there is in some instances a case for using this simplified piston for higher pressure categories since it is compatible with the universal design already described. In classes 19.1 and 19.2 where there is little shoulder 22 on the pipe to take up the thrust of the piston and limit its movement, the inwardly directed rim on the piston is required for this purpose and the rim 23 is required to provide means for retaining the seals 16. Both these rims can be dispensed with, as explained, where there is sufficient wall thickness of the pipe relative to spigot wall thickness to provide for piston abutment on the pipe shoulder.

The coupling described can be applied wherever advantages arise from the ability to fix spigot diameter and size of coupling with varying internal pressure.

The anti-bursting structure described above finds particular utility when the pipes 10.1 and 10.2 are of cement or asbestos cement.

I claim:

1. A coupling for connecting two hollow members which, in use, are internally pressurized, each member having a coupling spigot of lesser outside diameter than the outside diameter of the adjoining part of the member so that a shoulder is defined between each spigot and the adjoining part; an axially movable annular piston surrounding each spigot; surfaces on said members for limiting the distance through which the pistons can move in the direction away from one another; an annular collar surrounding the pistons; a collar seal sealing between each piston and the collar, the collar seals being located in grooves and the axial length of the collar being greater than the spacing between the collar seals when the pistons are at their maximum separation; and a spigot seal sealing between each piston and its spigot, the collar and pistons and seals defining a chamber which extends around the spigots and which is in communication with the interior of the spigots, the arrangement being such that, in use, the pressure in said chamber tends to force the pistons apart towards their respective shoulders, and both the insides and outsides of the spigots are subjected to the pressure within said members thereby to minimise the risk of the spigots bursting.

2. A coupling according to claim 1, in which each collar seal is located in a circumferentially extending, outwardly facing groove in the outer surface of its piston.

3. A coupling according to claim 2, in which said collar seals are positioned adjacent the ends of the pistons remote from the shoulders.

4. A coupling according to claim 1, in which the spigots seals are of compressible material and are subjected to the pressure in said chamber, these seals being internally pressurized in use, and their internal pressures being applied to the spigot so that the outer surface of each spigot is subjected partly to direct fluid pressure, and partly to the internal pressure of the spigot seal.

5. A coupling according to claim 4, in which each spigot seal is in a cavity which is open to said chamber on one side and to atmosphere on the other.

6. A coupling according to claim 1, in which the end of each piston remote from the shoulder is provided with a circumferentially extending, inwardly projecting rim for cooperation with the end of the associated spigot to limit movement of each piston towards the associated shoulder.

7. A coupling according to claim 1, in which the rim of each piston at its end adjacent the shoulder is reinforced.

8. A coupling according to claim 1, in which each spigot seal has a main annular portion and a circumferentially extending annular lip projecting axially from the side of the main annular portion remote from said chamber.

9. A coupling according to claim 1, in which said members are pipes.

10. A coupling for connecting two hollow members which, in use, are internally pressurized, each member having a coupling spigot which is externally bounded by a substantially cylindrical outer surface the diameter of which is smaller than the diameter of the outer surface of the adjacent part of the remainder of the member, and there being a joining surface of the form produced by rotating a curved generatrix along a circular path the center of which lies on the axis of the spigot, the joining surface merging at its radially inner end with said outer surface of said spigot and at its radially outer end joining the outer surface of said adjacent part, coupling component means forming a portion of a sealed annular chamber and said coupling component means encircling said spigots along substantially the entire length of the outer surfaces of said spigots and limited in their outward movement away from each other by said hollow members, the chamber being in communication with the interiors of said members, a pair of compressible sealing elements in the chamber which elements encircle the respective spigots and are positioned so as to be urged by pressure fluid in the chamber into sealing engagement with both the adjacent joining surface and that one of the coupling component means which is radially outwardly of that joining surface, said coupling component means and said sealing elements with said spigots forming said sealed annular chamber whereby each spigot outer surface and at least the radially inner part of each joining surface are subjected to inwardly directed antibursting forces derived from the pressure within said members, and the sealing element seal between said joining surfaces and the coupling component means.

11. A coupling according to claim 10, in which one end part of the generatrix lies at right angles to the other end part of the generatrix.

12. A coupling according to claim 10, in which each sealing element is of axially elongated form and is arranged so that part of its axial extent is urged into sealing engagement with the part of the spigot adjacent the joining surface and part of its extent is urged into sealing engagement with the joining surface.

* * * * *